Patented Oct. 6, 1942

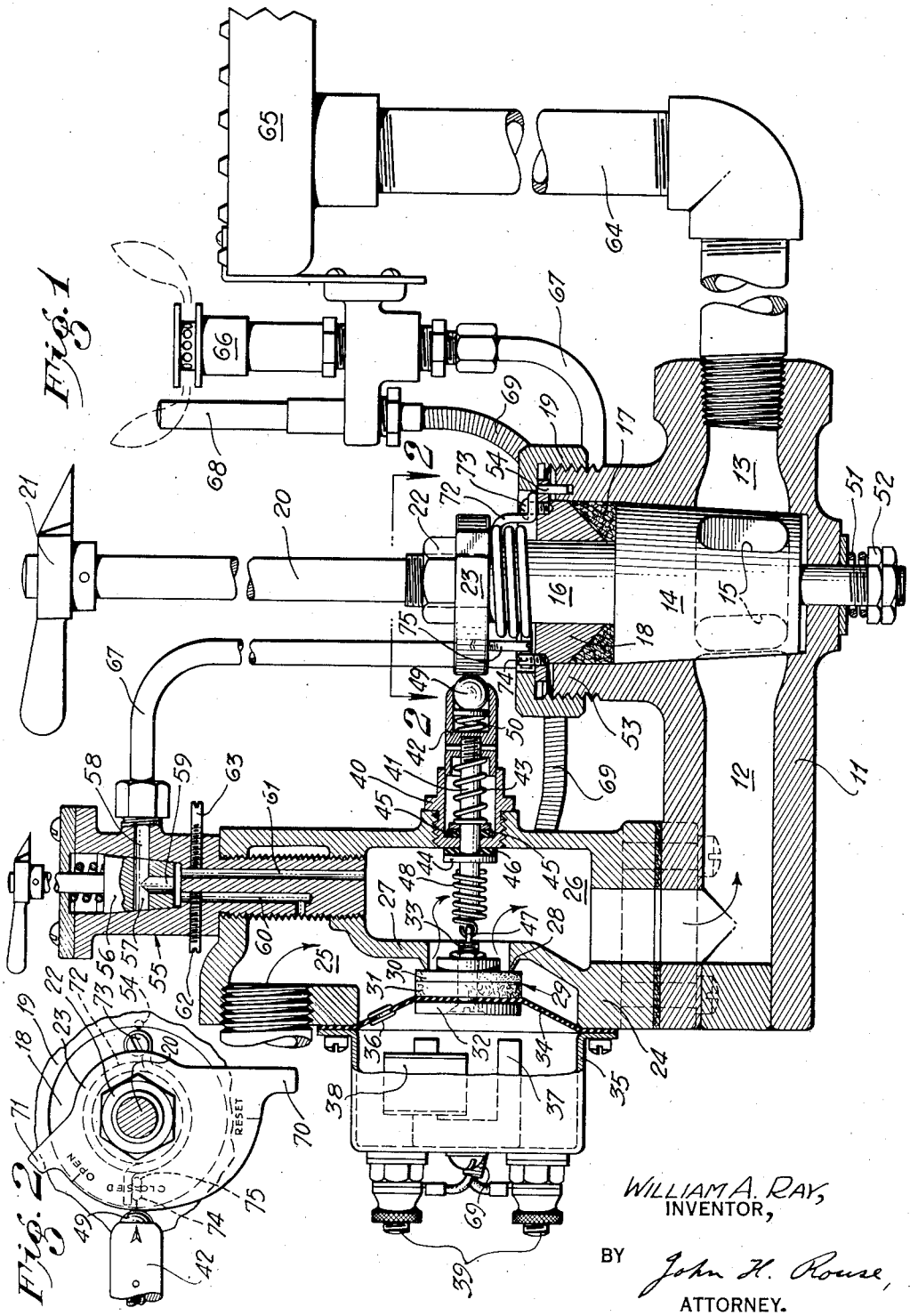

2,297,718

UNITED STATES PATENT OFFICE 2,297,718

FLUID CONTROL VALVE

William A. Ray, Glendale, Calif.

Application February 19, 1940, Serial No. 319,735

10 Claims. (Cl. 137—139)

My present invention relates to fluid control valves and has for an object the provision of an electromagnetically operated safety valve for controlling fluid supply to a valve of the rotary plug type, and means controlled by the rotation of the plug valve for resetting the safety valve, in the event that the same is closed, whereby fluid flow through the plug valve is permitted only when a safe condition exists.

My invention, in a specific form, embodies an electromagnetically operated safety valve of the type disclosed in my copending application, Serial No. 237,029, filed October 26, 1938, and which comprises a valve member biased to closed position and an electromagnet which when energized is effective to retain the valve member in open position against its bias only when the valve member is first mechanically moved to that position.

In the application of my invention to the control of gaseous fuel burners, current flow to the coil of the electromagnet is preferably controlled by means responsive to the flame of a pilot burner for the main burner so that upon failure of the flame the current flow ceases and the safety valve closes. Such means may consist of a thermoelectric generating device or a thermal cut-out controlling any suitable source of current.

It is a particular object of my present invention to provide a safety valve of the type described for controlling fuel supply to a plug valve manually operable to control fuel flow to the main burner, and means actuated by the rotation of the plug valve without opening the same for resetting the safety valve after failure of the pilot burner flame.

Other objects and advantages of my invention will be found in the description, the drawing, and the appended claims.

For complete understanding of the invention, reference may be had to the following detailed description and accompanying drawing, wherein:

Figure 1 is a mainly sectional view of apparatus embodying my invention; and

Figure 2 is a fragmentary section taken along the line 2—2 of Fig. 1.

In the drawing, the numeral 11 indicates a valve casing having an inlet 12 and an outlet 13, between which is a tapered plug valve member 14, rotatable in a cooperating tapered recess formed in the casing, and having a relatively narrow and elongated transverse passage 15 therethrough. A spring 51, compressed between a nut 52, threaded on a cylindrical bottom extension of the valve member 14, and the underside of the casing, retains the valve member in engagement with its seat. Sealing means for the cylindrical upper extension 16 of valve member 14 is provided by a packing member 17 compressed by the aid of a hollow conical member 18 and a nut 19, threaded on an upper extension 53 of the casing. Rotary movement of the member 18 is prevented by a pin 54 fixed in this member and cooperable with a recess formed in the upper surface of the casing extension 53. The upper portion 20 of the extension 16 is reduced in diameter and is provided at its upper end with an operating handle 21. A nut 22, threaded on the portion 20, holds a cam 23 securely in engagement with the upper surface of extension 16.

Surrounding the extension 16 of the plug valve member is a torsion spring 72, one end of which is secured by a screw 73 to the member 18, the other end engaging a stop pin 74 threaded in the same member 18. The spring is so arranged that it exerts a considerable force against the stop pin. A pin 75, threaded in the bottom surface of the cam 23, is adapted to engage and move the unsecured end of the spring when the valve member is rotated in a clockwise direction from the closed position shown in the drawing so that the valve member is returned to this position after such movement by the force of the spring. Rotation of the valve member in an opposite, or anticlockwise, direction from the closed position shown is unimpeded by the spring.

Because of the narrowness of the passage 15, the plug valve member may be rotated through 90 degrees in a clockwise direction from its closed position shown without opening the valve, but the valve may be fully opened by rotation through 45 degrees in an anticlockwise direction from said closed position.

Secured to the valve casing 11 is a safety valve casing 24 having an inlet 25 and an outlet 26, the outlet 26 of casing 24 communicating with the inlet 12 of casing 11. Separating the inlet and outlet of casing 24 is a ported partition 27 provided with an annular valve seat 28. Cooperable with this seat is a valve member generally indicated at 29 and comprising a disk 30 of artificial rubber or the like backed by a fibrous member 31 and a disk-shaped armature 32 of magnetic material. These members are held together by a screw 33 and are supported by a flexible diaphragm 34 interposed between the member 31 and the armature 32. The diaphragm 34 covers an opening formed in the side wall of the casing 24 and its marginal portion is secured thereto by the flange of a housing 35. An eyelet 36, fastened in an opening in the diaphragm and provided with a fine mesh screen (not shown), provides filtered fluid communication between the inlet 25 and the space within the housing 35.

Mounted in the housing 35 is an electromagnet comprising a U-shaped core 37, around one arm of which is an energizing coil 38, electrically connected to terminals 39. The core 37 is adapted when energized to magnetically hold the armature 32 when the same is first mechanically brought into engagement therewith by means which will hereinafter be described.

Reciprocable in a bushing 40, threaded in the right-hand wall of casing 24, is a rod 41 carrying on its outer end a button 42. A spring 43, compressed between the button 42 and the bushing 40, urges the rod 41 outward, an enlarged portion 44 of rod 41 limiting its movement in this direction. Packing disks 45 and 46 are provided respectively between the inner end of the spring 43 and the bushing, and between the portion 44 and the bushing. Connected at one end to the rod 41 adjacent the portion 44 and at its other end to the reduced end portion 47 of the valve member screw 33, is a contractile spring 48 which normally urges the valve member 29 toward closed position. Carried in a recess in the outer end of button 42 is a ball 49 compressed by a relatively stiff spring 50 against the surface of cam 23.

Threaded in the upper wall of the casing 24 and also in the partition 27, is a supplementary plug valve 55 comprising a valve member 56 having a transverse passage 57, communicating with an outlet 58, and an axial bottom passage 59. Connecting the space below this valve member respectively with the inlet 25 and the outlet 26 of the electromagnetically operated valve, are passageways 60 and 61. Screws 62 and 63 are adapted to open or close the passageways 60 and 61, respectively.

Connected to the outlet of the valve casing 11 by a conduit 64 is a main burner 65 for the ignition of which is provided a pilot burner 66, connected by a pipe 67 to the outlet 58 of valve 55. Arranged to be heated by the flame of the pilot burner is a thermoelectric generating device or thermocouple 68, the output of which is connected by a cable 69 to the terminals 39 of the electromagnet.

With the parts in the respective positions shown in the drawing, the safety valve member 29 is held closed by the force of spring 48 and the main plug valve member is in closed position; thus fuel supply to the main burner is stopped. Fuel supply to the pilot burner is also stopped by the safety valve, passageway 60 being closed by screw 62. If the main plug valve member is now rotated to the "Open" position indicated on the cam by the legend, so that the limiting projection 71 of the cam engages the button 42, the plug valve will be fully open but fuel still cannot pass to the main burner as the safety valve is closed.

To initiate operation of the system, the main plug valve member is rotated in a clockwise direction until the cam 23 is in the position, with respect to the button 42, indicated by the legend "Reset"; the projection 70 of the cam limiting movement in this direction. In this movement, the radius of the cam being increased considerably between the "Closed" and the "Reset" position, the cam, by engagement with ball 49, moves the rod 41 inward so that its inner end first engages the end portion 47 of the valve member screw, and on further movement forces the valve member into engagement with the end of core 37; the ball 49 being moved slightly inward when the cam is in its final position. With the valve member 29 thus held in open position, fuel cannot pass to the main burner as the plug valve member is still in closed position. However, fuel can now flow through passageway 61 to the supplementary valve 55 and thence to the pilot burner, where it may be lighted.

If, before the thermocouple has been heated long enough to generate current in an amount sufficient to energize the core 37 to magnetically hold the armature 32, (or, without lighting the pilot burner), the plug valve is allowed to return to its closed position, the safety valve member will again close, guided by the diaphragm 34. However, if the thermocouple is permitted to become sufficiently heated before the plug valve is returned, the safety valve member 29 will be magnetically held open against the force of the now expanded spring 48, the rod 41 being returned to its original position by the force of spring 43, which force is considerably greater than that of spring 48 when the latter is in its expanded condition.

Fuel flow to the main burner can now be controlled by rotation of the main plug valve member between its closed and open positions. As the radius of the cam is the same between these positions, the safety valve is not affected by this movement.

If the pilot burner flame is extinguished, upon cessation of current generation by the thermocouple the electromagnet releases the armature and the safety valve closes, stopping fuel supply to both the main and the pilot burner. The safety valve must then be reset as hereinbefore described to again initiate operation of the system.

If, in the event of the extinction of the pilot burner flame, stoppage of fuel supply to the pilot burner is not required, the pilot burner may be fed directly from the main inlet 25 by backing out the screw 62 sufficiently to open the passageway 60. The passageway 61 should then be closed by turning in screw 63 so that fuel cannot also pass to the main burner when the safety valve is closed and the plug valve open. When use of the burner system is discontinued for some length of time, the supplementary valve 55 may be closed to effect complete shut off. If, under some conditions, automatic control of the main burner is also desired, an automatically operated valve may be connected between the plug valve and the main burner, the safety features of the present invention being retained.

While I have herein shown and described a specific embodiment of my invention, I wish it to be understood that modifications may be made without departing from the spirit of my invention. I intend therefore that my invention be limited only by the scope of the appended claims.

I claim as my invention:

1. The combination with a plug valve and means for rotating the same between open and closed positions, of a safety valve connected to the inlet of said plug valve and comprising a valve member biased to closed position and electromagnetic means effective when energized to retain said valve member in open position against said bias when said valve member is first mechanically moved to said open position, and means operated by the movement of said plug valve rotating means for moving said safety valve member to and holding it in said open position only while maintaining said plug valve closed.

2. The combination with a plug valve having a plurality of closed positions and an open position and rotatable only manually between the positions, of a safety valve comprising a valve member biased to closed position and electromagnetic means effective when energized to retain said valve member in open position against said bias when said valve member is first mechanically moved to said open position, means connecting the outlet of said safety valve with the inlet of said plug valve, and means operable by the rotation of said plug valve while maintaining the same closed for moving said safety valve member to said open position and effective to hold it in that position only while the plug valve is closed.

3. In combination, a plug valve having a plurality of closed positions and an open position and rotatable between the positions, a safety valve comprising a valve member biased to closed position, electromagnetic means effective when energized to retain said valve member in open position against the force of said bias when said valve member is first mechanically moved to said open position, means connecting the outlet of said safety valve with the inlet of said plug valve, means operable by the rotation of said plug valve while maintaining the same closed for moving said safety valve member to said open position and effective to hold it in that position only while the plug valve is closed, and means intermediate said valves and defining a supplementary outlet for said safety valve.

4. In combination, a plug valve having a normal closed position and an open position and rotatable only manually between those positions, said plug valve also having an angle of movement through which it remains closed, a safety valve comprising a valve member biased to closed position, electromagnetic means effective when energized to retain said valve member in open position against the force of said bias when said valve member is first mechanically moved to said open position, means fluidly connecting the outlet of said safety valve with the inlet of said plug valve, and means operable by the rotation of said plug valve from its normal closed position for moving said safety valve member to said open position without opening said plug valve and for holding the safety valve member in open position only while the plug valve remains closed.

5. In combination, a plug valve having a normal closed position and an open position and rotatable only manually between those positions, said plug valve also having an angle of movement through which it remains closed, a safety valve comprising a valve member biased to closed position, electromagnetic means effective when energized to retain said valve member in open position against the force of said bias when said valve member is first mechanically moved to said open position, means fluidly connecting the outlet of said safety valve with the inlet of said plug valve, means operable by the rotation of said plug valve from its normal closed position for moving said safety valve member to said open position without opening said plug valve, and spring means for returning said plug valve to said normal closed position after said safety valve member has been moved toward said open position.

6. In combination, a plug valve having open and closed positions and manually rotatable between said positions, a safety valve comprising a valve member biased to closed position, electromagnetic means effective when energized to retain said valve member in open position against the force of said bias when said valve member is first mechanically moved to said open position, an actuating member for said valve member and extending exteriorly of said safety valve, means connected to said plug valve and engageable with said actuating member for moving said valve member into said open position while maintaining said plug valve closed and effective to hold it in that position only while the plug valve is closed, and means fluidly connecting the outlet of said safety valve with the inlet of said plug valve.

7. In combination, a plug valve having an open position and a plurality of closed positions and mechanically rotatable between said positions, a safety valve comprising a valve member biased to closed position, electromagnetic means including a core member and an armature member, one of said electromagnetic members being connected to said valve member, said core member being adapted when energized to magnetically hold said armature member when said electromagnetic members are first mechanically brought into engagement with each other, means extending exteriorly of said safety valve and effective by movement in one direction to move said valve member into open position and said electromagnetic members into engagement with each other, means actuated by rotation of said plug valve for moving said exteriorly extending means in said one direction without opening said plug valve and for holding it in moved position only while the plug valve is closed, and means fluidly connecting the outlet of said safety valve with the inlet of said plug valve.

8. In combination, a plug valve having a normal closed position and an open position and rotatable only manually between those positions, said plug valve also having an angle of movement through which it remains closed, a safety valve comprising a valve member biased to closed position, electromagnetic means including a core member and an armature member, one of said electromagnetic members being connected to said valve member, said core member being adapted when energized to magnetically hold said armature member when said electromagnetic members are first mechanically brought into engagement with each other, means extending exteriorly of said safety valve and effective by movement in one direction to move said valve member into open position and said electromagnetic members into engagement with each other, means operable by the rotation of said plug valve from its normal closed position for moving said exteriorly extending means in said one direction without opening said plug valve, spring means for returning said plug valve to said normal closed position after said exteriorly extending means has been moved in said one direction, and means fluidly connecting the outlet of said safety valve with the inlet of said plug valve.

9. The combination with a rotary plug valve having an open position and a plurality of closed positions, of an automatic safety valve fluidly connected in series with the plug valve, said safety valve including reset means whereby it can temporarily be opened, and means operated by the movement of said plug valve for holding said reset means in active position only while said plug valve is closed.

10. In combination, a rotary plug valve having an open position and a plurality of closed positions, said plug valve being rotatable from a normal closed position to another closed position without opening the valve, an automatic safety valve fluidly connected in series with the plug valve, said safety valve including reset means whereby it can temporarily be opened, and means for actuating said reset means operated by the rotation of said plug valve from said normal closed position toward said other closed position, said last-named means being effective to hold the reset means in safety-valve-opening position only while the plug valve is closed.

WILLIAM A. RAY.